United States Patent [19]

Togane

[11] Patent Number: 4,846,987
[45] Date of Patent: Jul. 11, 1989

[54] LOW LOSS OXIDE MAGNETIC MATERIAL

[75] Inventor: Hikohiro Togane, Sagamihara, Japan

[73] Assignee: Mitsubishi Denki Kabushiki Kaisha, Tokyo, Japan

[21] Appl. No.: 207,641

[22] Filed: Jun. 16, 1988

[30] Foreign Application Priority Data

Jun. 19, 1987 [JP] Japan ................ 62-152858

[51] Int. Cl.$^4$ .............................. C04B 35/26
[52] U.S. Cl. ................ 252/62.6; 252/62.62; 252/62.64
[58] Field of Search ............... 252/62.6, 62.62, 62.64

[56] References Cited

U.S. PATENT DOCUMENTS 3,660,292  5/1972  Bryce ................ 252/62.64

FOREIGN PATENT DOCUMENTS 58-45160  3/1983  Japan ................ 252/62.62
985564    8/1988  United Kingdom .

OTHER PUBLICATIONS

"Practical considerations in the design of horizontal deflection systems . . . " Aug. 1983.
"A Clamshell deflection yoke . . . " (1985).

Primary Examiner—Jack Cooper
Attorney, Agent, or Firm—Oblon, Spivak, McClelland, Maier & Neustadt

[57] ABSTRACT

A low loss oxide magnetic material having low magnetic loss characteristic and being usable as the deflection yoke care for high speed scanning cathode ray tube, etc., which consists essentially of $Fe_2O_3$, MgO, ZnO and MnO as the principal constituents; and $Bi_2O_3$ and CuO as the auxiliary constituents.

2 Claims, 4 Drawing Sheets

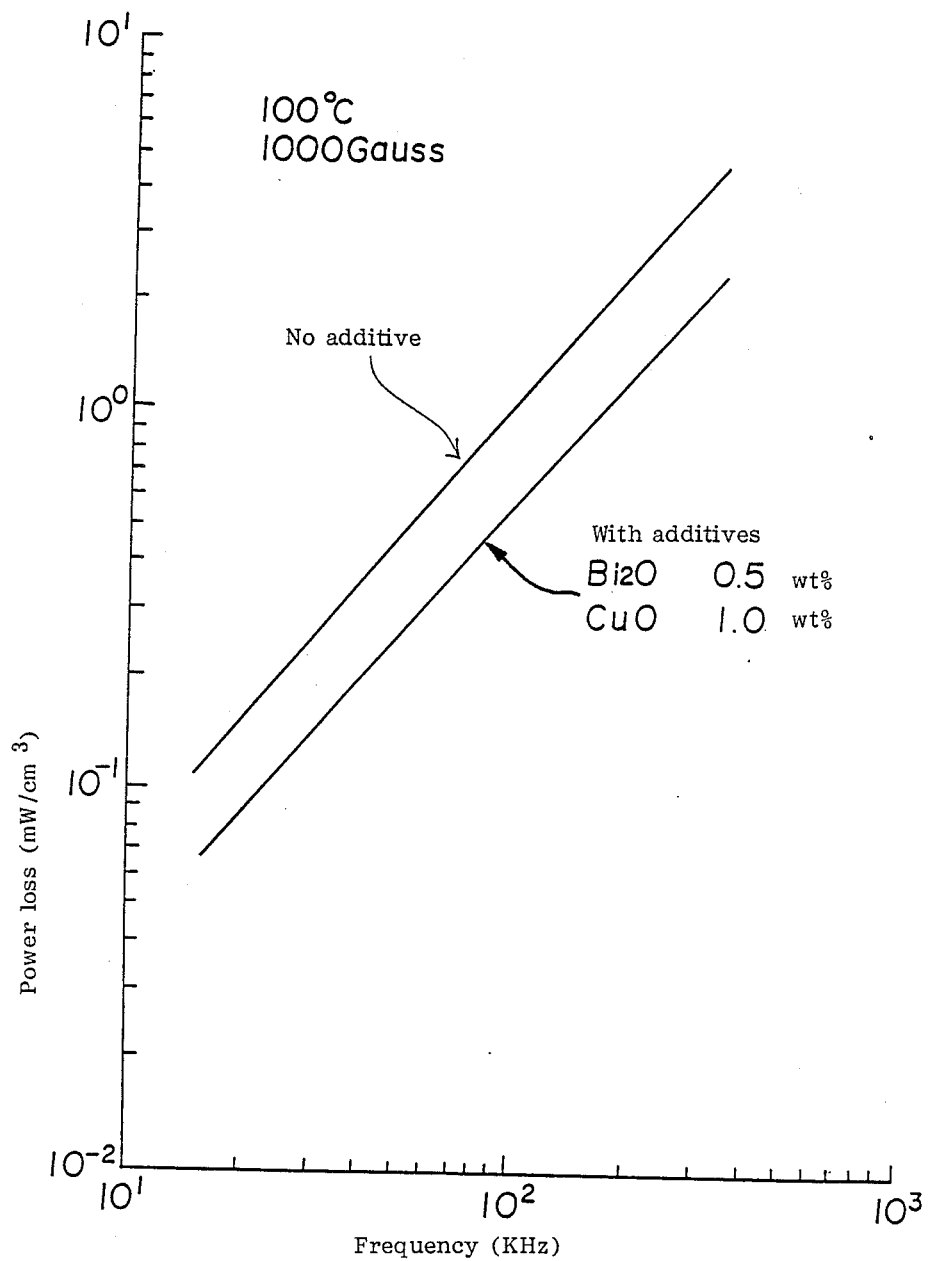

LOW LOSS OXIDE MAGNETIC MATERIAL

BACKGROUND OF THE INVENTION

Field of the Invention

This invention relates to a magnetic material, and, more particularly, it is concerned with a low loss oxide magnetic material which is usable as a deflection yoke core for a high speed scanning cathode ray tube (hereinafter abbreviated as "CRT").

Discussion of Background

As the deflecting yoke core for CRT, there has long been used Mg-Mn-Zn series ferrite. This material has been widely used both domestic and foreign as the standard ferrite material for the deflection yoke core, because it has high resistivity and hence vertical windings can be directly applied onto the core of such ferrite material with advantage.

On the other hand, owing to rapid diffusion in recent years of office automation (OA), computer-assisted-design (CAD), computer-assisted-manufacture (CAM), and so on, there is increasing demand for CRT for graphic display, monitor display, etc. which are required to have high resolution. These CRT's are required to have high performance which is absent in the conventional CRT's for the household television sets, since such CRT's are scanned at high speed and therefore have high horizontal deflection frequency. On account of this, with the core for the deflection yoke wherein the winding system for the horizontal and vertical windings, improvement in the convergence properties, etc. have been advanced energetically, the problems of the self-heat-generation of the core, and so on have become ineglible with increase in the horizontal deflection frequency, and the reduction in loss of the core is the urgent task.

The Mg-Mn-Zn series ferrite which is used at present as the standard material has been developed with a view to enabling the vertical windings to be directly wound on and around the core. However, while this ferrite material has less vortex loss which occupies in the total loss of the material because of its high resistance, the hysteresis loss thereof due to various influences such as composition of the material, crystal structure thereof, and various other factors is relatively great, the improvement of which has been the urgent task.

Therefore, when the core for the deflection yoke was manufactured with a low loss Mn-Zn series ferrite which is used as a main transformer material for the switching power source, etc., there could be observed that the temperature rise in the deflection yoke core was fairly improved due to reduction in the core loss. However, the ringing phenomenon took place on the screen of the CRT. Thus, it has become apparent that adoption of this CRT is not possible from the point of its image quality.

This ringing phenomenon, when taking the horizontal winding as an example, produces potential distribution between the adjacent layers of the windings, in case a voltage in the form of an impulse is introduced as an input, whereby capacity is generated between the adjacent scanning lines. Also, in general, when the frequency becomes higher, the floating capacity tends to increase. This can be inferred that there is brought about resonance between the component C of the capacity and the component L of the windings, and the deflection current is subjected to the speed-modulation, with the result that there emerge on the screen the brightness-modulated vertical stripes.

On the other hand, in the vertical winding, there is brought about distributed capacity between the winding and the core at the result of applying the winding in the toroidal form directly on the core. On account of this, there is formed a distribution circuit consisting of distribution of the electrostatic capacity between the winding and the core, inductance of the winding, and resistance of the core. This circuit is symmetrical in its left and right sides. If the horizontal winding is also symmetrical in its left and right sides, there should be no coupling of the horizontal winding with respect to the inductance of this circuit. If, however, there exists a certain asymmetry, there takes place coupling with the current flowing through the horizontal winding with the consequence that vibrating current flows locally in and through the vertical winding.

According to analyses done by the present inventor, it has been found that this vibrating current becomes increased, as the resistivity becomes smaller, and that the critical resistance is $10^4$ ohm-m. It goes without saying that the greater this value is, the more is it desirable.

From such standpoint, there has been porposed a low loss oxide magnetic material, while still retaining its high resistance. Such material is Ni-Cu-Mn-Zn series ferrite, which has attained its low loss which is approximately half that of the conventional Mg-Mn-Zn series ferrite and is utilized as the ferrite for the high speed scanning deflecion yoke in a frequency range of from 64 KHz to 90 KHz.

However, the conventional low loss oxide magnetic material of the abovementioned composition contains therein nickel (Ni) which is expensive and is rare in the natural resources, on account of which there was a problem such that disadvantage in the aspect of its manufacturing cost could not be avoided.

SUMMARY OF THE INVENTION

The present invention has been made with a view to solving the points of problem as mentioned in the foregoing, and aims at providing a low loss oxide magnetic material which is capable of reducing the self-heat-generation of the core by increasing its deflection frequency, is capable of suppressing the ringing phenomenon which is liable to bring about deterioration in the image quality, and is susceptible of being used as the deflection yoke core for a high resolution CRT, etc.

According to the present invention, there is provided a low loss oxide magnetic material which consists essentially of, as the principal components, 43 to 47 mol % of $Fe_2O_3$, 27 to 35 mol % of MgO, 13 to 20 mol % of ZnO and 3 to 10 Mol % of MnO; and, as the auxiliary components, 0 to 1.5 % by weight of $Bi_2O_3$ and 0 to 1.5 % by weight of CuO.

The foregoing object, other objects as well as specific construction and properties of the magnetic material according to the present invention will become more apparent and understandable from the following detailed description thereof, when read in conjunction with the accompanying drawing illustrating a couple of preferred examples according to the present invention.

BRIEF DESCRIPTION OF THE ACCOMPANYING DRAWING

In the drawing:

FIG. 4 is a graphical representation showing the power loss versus frequency relationship of the same test specimens as shown in FIG. 3.

DETAILED DESCRIPTION OF PREFERRED EMBODIMENTS

Figure 1:
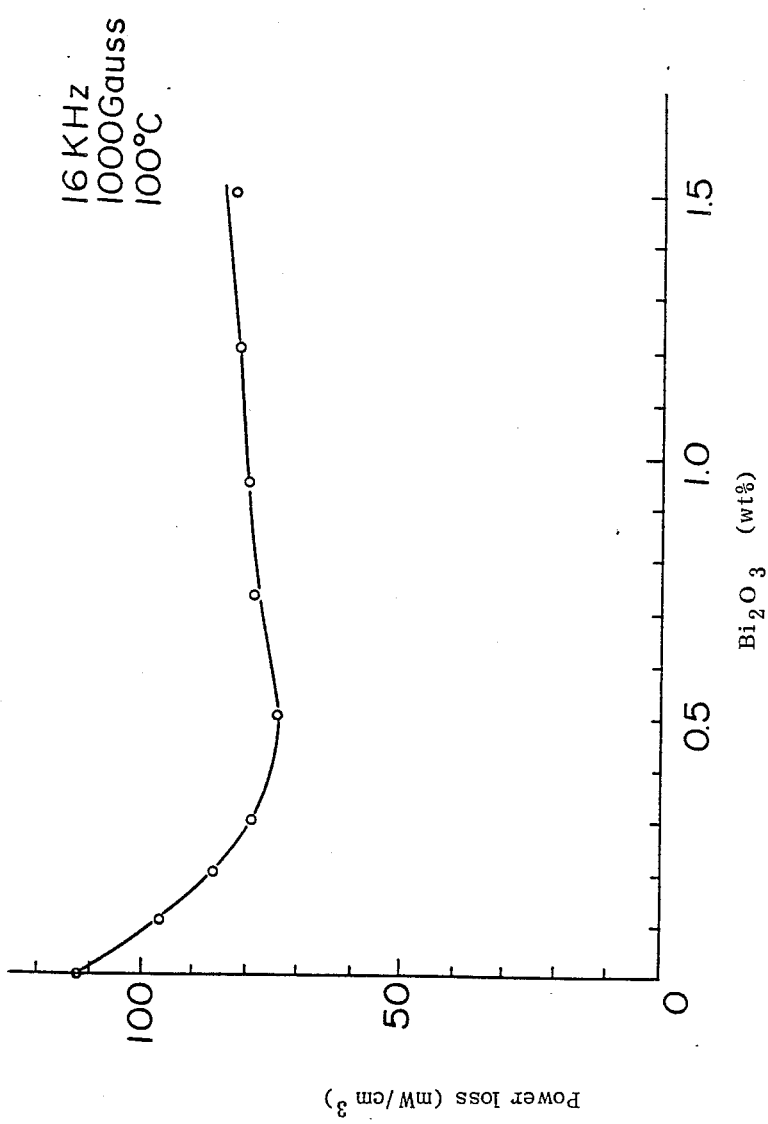
FIG. 1 is a graphical representation showing a relationship between the adding quantity of $Bi_2O_3$ and the electric power loss.

In the following, the present invention will be described in detail with reference to preferred embodiments thereof.

The low loss oxide magnetic material according to the present invention can be obtained by adding to an Mg-Mn-Zn series ferrite at least one element which is capable of reducing the power loss thereof without decreasing its specific resistance.

Such magnetic material has low power loss, while maintaining high specific resistance, so that it is able to suppress self-heat-generation of the deflection yoke core, to increase operating reliability of the deflection yoke, and, at the same time, is capable of reducing the ringing phenomenon which has been the main factor of deterioration in the quality of image on the CRT.

With a view to enabling those persons skilled in the art to put the present invention into practice, the following examples are presented.

EXAMPLE 1

Starting materials were weighed so as to obtain a composition consisting of 45.0 mol % of $Fe_2O_3$, 31.0 mol % of MgO, 7.0 mol % of MnO and 17.0 mol % of ZnO.

The powder mixture of these starting materials was calcined for one hour at a temperature of 850° C., followed by pulverizing the calcined material in a ball mill for four hours, thereby obtaining a test material.

Subsequently, $Bi_2O_3$ was added to this test material in a quantity ranging from 0 to 1.5 % by weight as shown in Table 1 below, and the material added with differeing quantities of $Bi_2O_3$ were uniformly mixed by means of a crush-mixer. Thereafter, polyvinyl alcohol solution was added in a quantity of 10% by weight with respect to the ferrite powder so as to granulate the material, which was then shaped into annular test specimens under a pressure of 1 ton/cm².

These test specimens were sintered in the atmosphere for two hours at a temperature of 1,250° C., and the thus obtained annular test specimens were measured for their electro-magnetic properties with the results being shown in Table 1 below as well as in FIG. 1.

TABLE 1

| $Bi_2O_3$ (wt. %) | $\mu i$ (100 KHz) | tan $\delta/\mu i$ (100 KHz) | Power Loss (16 KHz, 1000 Gauss) 20° C. | 100° C. | Resistivity ($\Omega \cdot m$) |
|---|---|---|---|---|---|
| 0 | 348 | $5.7 \times 10^{-5}$ | 182 mW/cm³ | 112 mW/cm³ | $9.9 \times 10^6$ |
| 0.1 | 410 | $5.6 \times 10^{-5}$ | 165 | 97 | $9.3 \times 10^6$ |
| 0.2 | 430 | $5.6 \times 10^{-5}$ | 158 | 86 | $9.0 \times 10^6$ |
| 0.3 | 453 | $5.5 \times 10^{-5}$ | 145 | 79 | $8.7 \times 10^6$ |
| 0.5 | 486 | $5.1 \times 10^{-5}$ | 140 | 75 | $8.5 \times 10^6$ |

TABLE 1-continued

| $Bi_2O_3$ (wt. %) | $\mu i$ (100 KHz) | tan $\delta/\mu i$ (100 KHz) | Power Loss (16 KHz, 1000 Gauss) 20° C. | 100° C. | Resistivity ($\Omega \cdot m$) |
|---|---|---|---|---|---|
| 0.7 | 487 | $5.1 \times 10^{-5}$ | 138 | 79 | $8.1 \times 10^6$ |
| 1.0 | 482 | $5.3 \times 10^{-5}$ | 136 | 80 | $7.9 \times 10^6$ |
| 1.2 | 475 | $5.4 \times 10^{-5}$ | 133 | 82 | $7.3 \times 10^6$ |
| 1.5 | 477 | $5.5 \times 10^{-5}$ | 135 | 85 | $6.5 \times 10^6$ |

From the above tabulated test results, it is seen that the addition of $Bi_2O_3$ remarkably improves the power loss, while maintaining the specific resistance without its substantial change.

EXAMPLE 2

Starting materials were weighed so as to obtain a composition consisting of 45.0 mol % of $Fe_2O_3$, 31.0 mol % of MgO, 7.0 mol % of MnO, and 17.0 mol % of ZnO.

The powder mixture of these starting materials was calcined for one hour at a temperature of 850° C., followed by pulverizing the calcined material in a ball mill for four hours, thereby obtaining a test material.

Subsequently, $Bi_2O_3$ and CuO were added to this test material in a quantity as shown in Table 2 below, and the material added with differing quantities of $Bi_2O_3$ and CuO were uniformly mixed by means of a crush-mixer. Thereafter, polyvinyl alcohol solution was added in a quantity of 10% by weight with respect to the ferrite powder to granulate the material, which was then shaped into annular test specimens under a pressure of 1 ton/cm².

These test specimens were sintered in the atmosphere for two hours at a temperature of 1,250° C., and the thus obtained annular test specimens were measured for their electro-magnetic characteristics with the results being shown in Table 2 below as well as in FIGS. 2 to 4.

TABLE 2

| $Bi_2O_3$ (wt. %) | CuO (wt. %) | $\mu i$ (100 KHz) | tan $\delta/\mu i$ (100 KHz) | Power Loss (16 KHz, 1000 Gauss) 20° C. | 100° C. | Resistivity ($\Omega \cdot m$) |
|---|---|---|---|---|---|---|
| 0 | 0 | 348 | $5.7 \times 10^{-5}$ | 182 mW/cm³ | 112 mW/cm³ | $9.9 \times 10^6$ |
| 0.3 | 0.2 | 425 | $6.6 \times 10^{-5}$ | 137 | 82 | $9.4 \times 10^6$ |
|  | 0.5 | 398 | $8.0 \times 10^{-5}$ | 130 | 76 | $9.1 \times 10^6$ |
|  | 1.0 | 337 | $11.7 \times 10^{-5}$ | 122 | 71 | $8.7 \times 10^6$ |
|  | 1.5 | 286 | $16.5 \times 10^{-5}$ | 125 | 76 | $8.5 \times 10^6$ |
| 0.5 | 0.2 | 446 | $6.4 \times 10^{-5}$ | 133 | 78 | $8.3 \times 10^6$ |
|  | 0.5 | 418 | $7.8 \times 10^{-5}$ | 122 | 77 | $8.1 \times 10^6$ |
|  | 1.0 | 353 | $11.8 \times 10^{-5}$ | 118 | 68 | $7.9 \times 10^6$ |
|  | 1.5 | 319 | $16.1 \times 10^{-5}$ | 116 | 77 | $7.6 \times 10^6$ |
| 1.0 | 0.2 | 452 | $6.7 \times 10^{-5}$ | 146 | 87 | $6.5 \times 10^6$ |
|  | 0.5 | 423 | $8.2 \times 10^{-5}$ | 140 | 82 | $6.0 \times 10^6$ |
|  | 1.0 | 348 | $12.5 \times 10^{-5}$ | 135 | 75 | $5.5 \times 10^6$ |
|  | 1.5 | 360 | $17.2 \times 10^{-5}$ | 129 | 78 | $4.9 \times 10^6$ |

From the above tabulated test results, it is seen that, by addition of $Bi_2O_3$ and CuO in combination, the power loss of the material is further improved.

Figure 2:
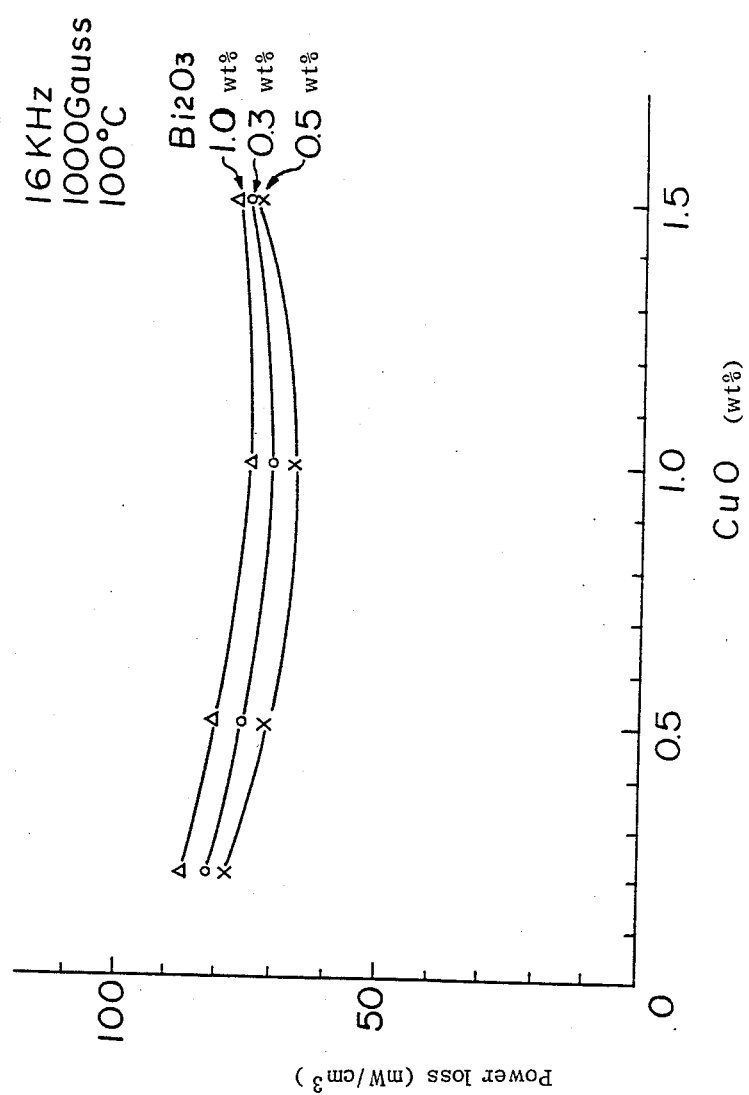
FIG. 2 is a graphical representation showing changes in the power loss, when $Bi_2O_3$ and CuO are added in combination.

By the way, FIG. 1 is a graphical representation showing a relationship between the adding quantity of $Bi_2O_3$ and the electric power loss, while FIG. 2 is a graphical representation showing changes in the power loss, when $Bi_2O_3$ and CuO are added in combination, the measuring conditions for both FIGS. 1 and 2 being 16 KHz, 1,000 Gausses and 100° C.

Figure 3:
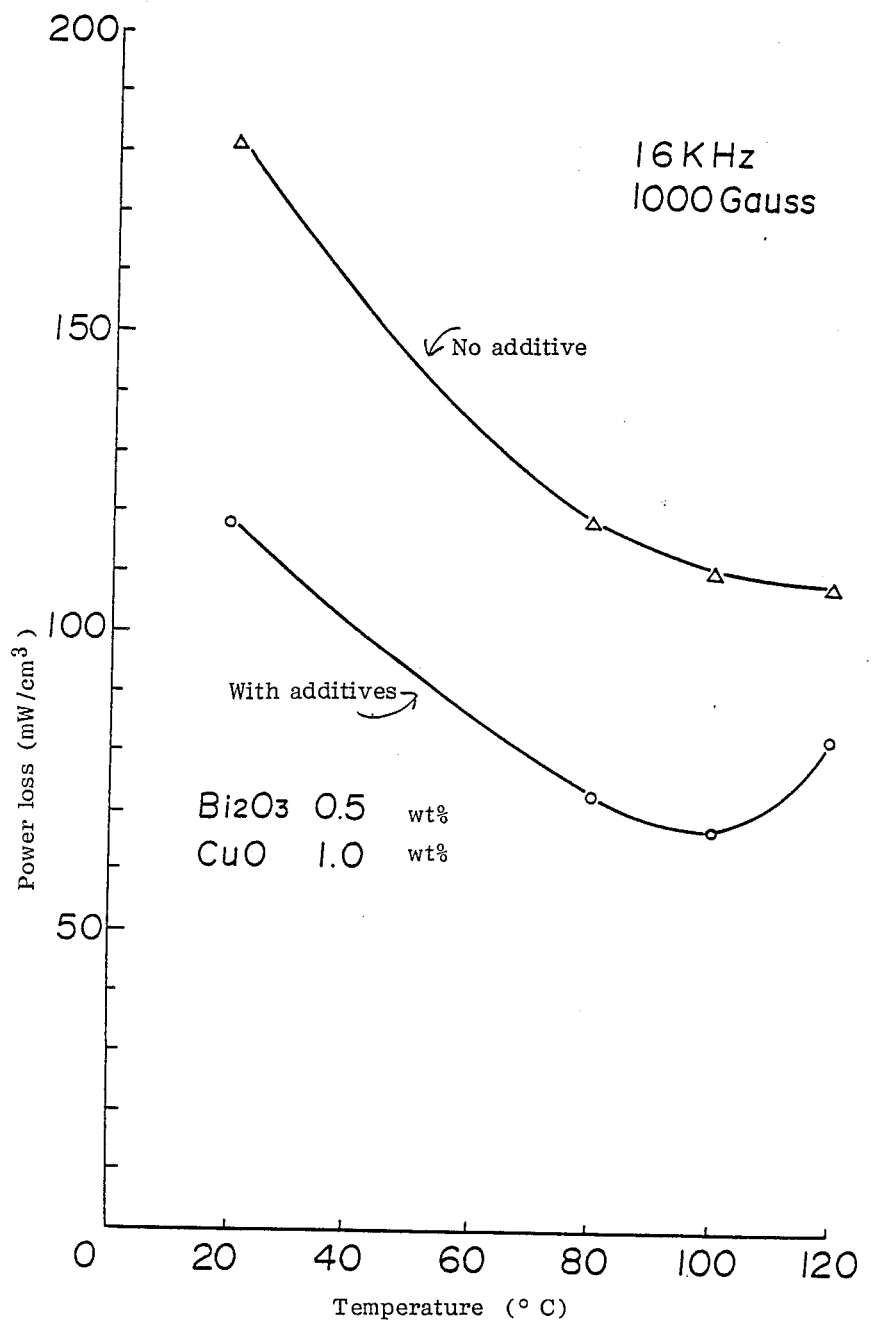
FIG. 3 is a graphical representation showing the power loss versus temperature characteristics, when 0.5 % by weight of $Bi_2O_3$ and 1.0 % by weight of CuO are added in combination.

FIG. 3 is a graphical representation showing the power loss versus temperature characteristics, when 0.5% by weight of $Bi_2O_3$ and 1.0% by weight of CuO are added in combination, wherein the measuring conditions are 16 KHz and 1,000 Gausses.

FIG. 4 is a graphical representation showing the power loss versus frequency relationship of the same test specimens as shown in FIG. 3, wherein the measuring conditions are 1,000 Gausses and 100° C.

From the above results, the adding quantity of $Bi_2O_3$ is up to and including 1.5% by weight, in excess of which the power loss of the material would increase badly to thereby bring about inconvenience such that cracks and other defects would occur in the sintered articles. In the same way, the adding quantity of CuO is also up to 1.5% by weight.

By the way, in the foregoing examples of the present invention, use was made of oxides as the material for the ferrite and the additives. It goes without saying, however, that similar effect can be obtained with use of those compounds such as carbonates, etc. which are decomposed into oxides upon heating.

The magnetic material according to the present invention finds its use not only in the deflection yoke, but also in other uses wherein it is placed in high magnetic flux with accompaniment of high heat generation.

As described in the foregoing, the present invention makes it possible to remarkably improve the power loss of the Mg-Mn-Zn series ferrite by addition thereto of those additives such as $Bi_2O_3$, CuO, and others without giving influence on the specific resistance of the material, which is of consequence in respect of the characteristic property as the deflection yoke core. On account of this, it becomes possible to suppress heat generation of the deflection yoke, etc., whereby improvement in the operating reliability, miniaturization, and reduced weight of the part can be realized.

Although, in the foregoing, the present invention has been described with reference to specific examples thereof, the invention is not restricted to these examples alone, but any changes and modifications may be made by those persons skilled in the art within the spirit and scope of the invention as recited in the appended claims.

What is claimed is:

1. A ferrite magnetic material exhibiting low power loss for use as a deflector yoke core for a high speed scanning cathode ray tube, consisting essentially of 43–47 mol % of $Fe_2O_3$, 27–35 mol % of MgO, 13–20 mol % of ZnO, 3–10 mol % of MnO, $Bi_2O_3$ in an amount of about 0.3–1.0 wt. %, and CuO in an amount of about 0.2–1.5 wt. %.

2. The ferrite magnetic material of claim 1, wherein $Fe_2O_3$ is present in an amount of 45.0 mol %, MgO is present in an amount of 31.0 mol %, MnO is present in an amount of 7.0 mol % and ZnO is present in an amount of 17.0 mol %.

* * * * *